United States Patent Office 3,394,545
Patented July 30, 1968

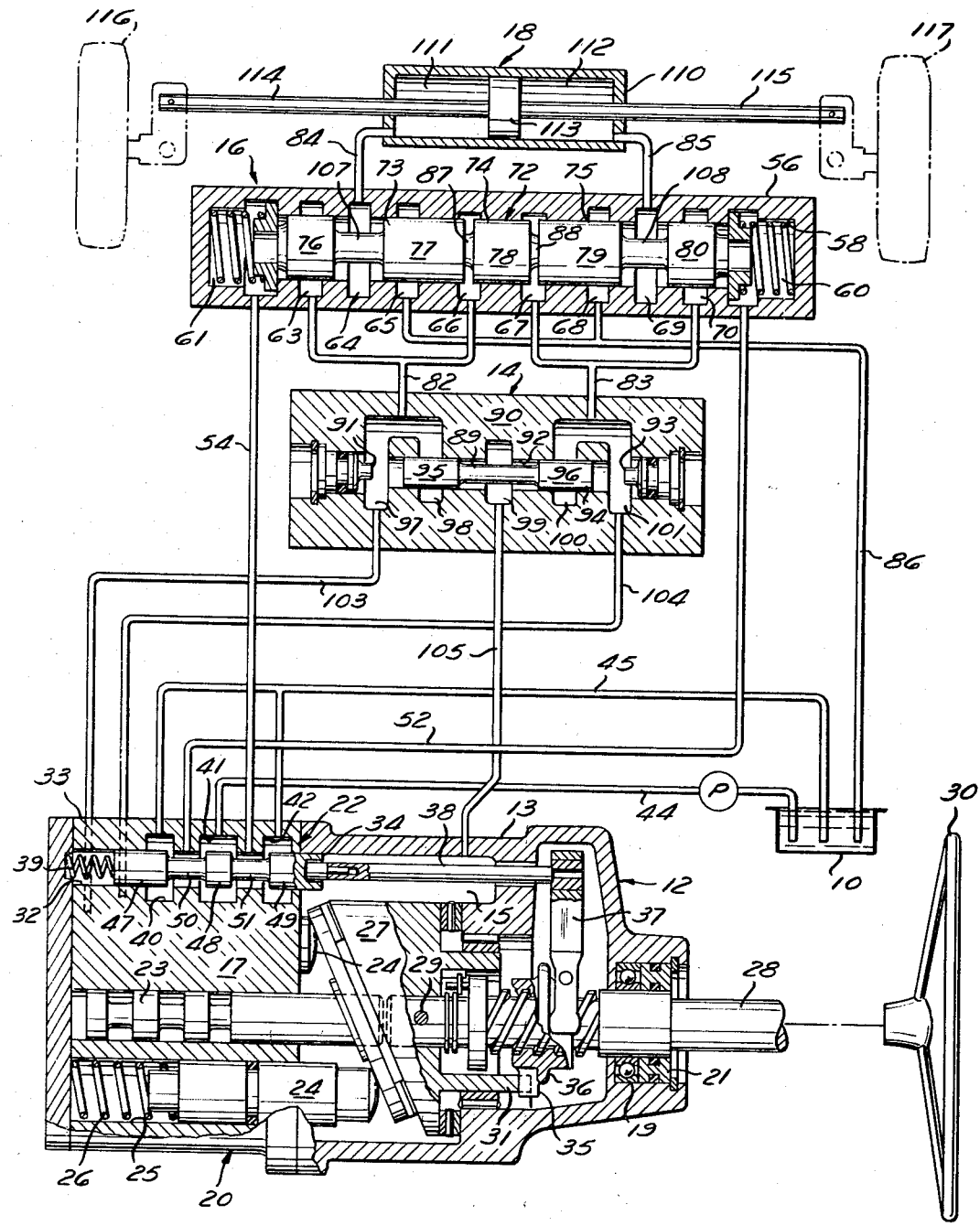

3,394,545
HYDRAULIC STEERING SYSTEM
Jack Thompson, South Euclid, Eugene Bahniuk, Gates Mills, and Tadeusz Budzich, Moreland Hills, Ohio, assignors to The Weatherhead Company, Cleveland, Ohio, a corporation of Ohio
Filed Mar. 2, 1967, Ser. No. 620,000
14 Claims. (Cl. 60—52)

ABSTRACT OF THE DISCLOSURE

A hydrostatic vehicle steering system wherein fluid is directed from a power driven pump through a metering valve and a selector valve to reversible expansible chamber actuator motor. A reversible positive displacement feedback motor capable of being manually driven as a pump by the steering shaft during failure of the power driven pump provides a feedback means for the metering valve which is responsive to movement of the actuator motor. The system includes pressurization valve means interconnected across the inlet and outlet of the feedback motor and actuated by the higher of the two pressures therein to port the lower pressure to the feedback motor case thereby decreasing the pressure differential across the feedback motor pistons.

---

This invention relates generally to hydraulic control systems and more particularly to hydrostatic vehicle steering systems utilizing a positive displacement feedback motor.

The flow of fluid to the actuator motor is controlled through a metering valve operated by the rotation of the vehicle's steering wheel. A hydrostatic steering system has no direct mechanical connection between the steering wheel and the steerable wheels as does a conventional power assisted steering system. Therefore, in order to provide the operator with a sense of steering feel and with manual control of the steering system should the supply of pressurized fluid to the metering valve fail, the hydrostatic system is provided with a positive displacement feedback mechanism.

The feedback mechanism provides a follow up action on the metering valve so that as the actuator motor moves the steerable wheels to a position corresponding to the angular displacement of the steering wheel, further movement of the vehicle wheels ceases. Such a feedback mechanism generally takes the form of a reversible positive displacement motor capable of being manually driven as a pump by rotation of the steering wheel to supply pressurized fluid directly to the actuator motor should the normal supply of pressurized fluid to the metering valve fail. During normal operation of the hydrostatic steering system, the fluid being supplied to the actuator motor generally actuates the feedback motor to rotate it in direct proportion to the movement of the actuator motor. The feedback motor is connected to the metering valve so that as the feedback motor rotates, the metering valve is returned to a neutral position and cuts off the flow of fluid to the actuator motor when the position of the steerable wheels corresponds to the angular displacement of the steering wheel.

Some hydrostatic systems also include a condition selector valve interconnecting the metering valve, the feedback motor and the actuator motor in such a manner as to direct the flow of fluid to the actuator motor in the proper sequence during both power and manual operation of the system and to block off the actuator motor when the steering wheel is in the neutral position thereby preventing external forces on the wheels from shifting the position of the actuator motor.

Such arrangements have been disclosed in the copending application of Eugene Bahniuk, Tadeusz Budzich and Jack L. Thompson, Ser. No. 492,819, filed Oct. 4, 1955, now Patent No. 3,320,745, issued May 23, 1967 and of Eugene Bahniuk and Jack L. Thompson, Ser. No. 503,808, filed Oct. 23, 1965, now Patent No. 3,347,041, issued Oct. 17, 1967.

Since any leakage at the feedback motor results in drift of the system this leakage is minimized by using a feedback motor of the piston-type arranged so that it can be operated manually as a pump by rotation of the steering wheel. However, during the normal power operation of these systems, the work required from the feedback motor to reposition the metering valve is relatively small as compared to the work required when used as a pump to drive the actuator motor under manual operating conditions. This is particularly true because the feedback motor must have a fairly large displacement to give the necessary speed of steering to minimize the amount of steering wheel rotation required.

In the systems referred to above, the feedback motor case and, therefore, the ends of the pistons adjacent the cam plate were vented to the atmosphere. This arrangement creates a relatively large pressure differential across the pistons resulting in relatively high mechanical stress loads on the feedback motor and in substantial hydraulic losses due to leakage past the pistons, both of which substantially decrease the operating efficiency of the feedback motor and increase the wear thereon.

To overcome this problem, the present invention provides a system including a positive displacement feedback motor and a valve arrangement for pressurizing the case or housing of the feedback motor to a pressure higher than atmospheric but lower than the working pressure of the feedback motor. This greatly reduces the pressure differential across the feedback motor and is accomplished by interconnecting the valves assembly across the inlet and outlet lines of the feedback motor. The valve is actuated by the higher pressure in the two lines and ports the lower pressure to the cavity within the case of the feedback motor to decrease the pressure differential across the working elements of the motor.

With the system operating in a normal power steering condition, the feedback motor case is ported to the inlet side of the actuator motor. This increases the case pressure and reduces the pressure differential across the pistons, and permits the feedback motor to operate in a substantially unloaded state. This reduction in pressure differential across the pistons results both in lower mechanical stresses on the feedback motor and less leakage across the pistons thereby increasing the operating life of the feedback motor assembly and substantially eliminating the wheel drift caused by such leakage.

If the supply of pressurized fluid to the metering valve fails and the feedback motor is manually operated as a pump, the feedback motor case is ported to the inlet side of the feedback motor allowing the feedback motor case to function as an oil reservoir to replenish any leakage from the system.

It is therefore an important object of the present invention to provide a novel and improved hydrostatic steering system.

It is another important object of the present invention to provide a novel case pressurization means for a positive displacement feedback motor.

It is another important object of the present invention to provide a novel means for porting the lower of two system pressures within a hydrostatic steering system to the feedback motor assembly to decrease the pressure differential across the working elements.

Further objects and advantages of this invention will readily be apparent to those skilled in the art upon a more complete understanding of the preferred embodiment of the invention which is described in the following detailed description and shown in the accompanying drawing which schematically illustrates a hydrostatic steering system incomporating a case pressurization mechanism according to the preferred embodiment of the present invention.

The illustrated hydrostatic steering system includes a reservoir 10, a pump P, a feedback motor and metering valve assembly, indicated generally at 12, a case pressurization valve assembly 14, a selector valve assembly 16 and an expansible chamber fluid actuator motor 18. For the purpose of illustrating the present invention the case pressurization valve assembly 14 and the selector valve assembly 16 have been shown as separate units from the combined feedback motor and metering valve assembly 12. However, it is to be understood that the feedback motor, metering valve, case pressurization valve, and selector valve may be incorporated into a single integrated unit or interconnected as separate components.

The feedback motor and metering valve assembly 12 includes a casing 13 housing the feedback motor, indicated generally at 20, and a metering valve indicated generally at 22. The feedback motor 20 is of the rotary cam plate axial piston type and the metering valve 22 is shown as being of the axial sliding spool type. The feedback motor 20 is a positive displacement axial piston fluid motor having a pintle valve arrangement 23 for sequentially directing the fluid to and from working elements of reciprocating pistons 24 disposed within cylinder bores 25 in cylinder block 17 and acting against a cam plate 27. The operation of one such pintle valve arrangement is shown and described in the aforementioned copending application of Eugene Bahniuk and Jack L. Thompson, Ser. No. 503,808 filed Oct. 23, 1965 and assigned to the assignee of the present application. A steering shaft 28 having a selector means or steering wheel 30 on its outer end is connected at its inner end to the cam plate 27 by a lost motion pin connection 29 and rotatably journalled and sealed to the casing 13 by a bearing assembly 19 and a high pressure seal 21. The feedback motor 20 is constructed to function either as a fluid driven motor when the pistons 24 are driven by pressurized fluid from the pump P or as a fluid pump when the cam plate 27 is manually rotated by the steering wheel 30 through the lost motion connection 29. In the latter case, the piston return springs 26 maintain the pistons in engagement with the cam plate at all times.

The illustrated metering valve 22 is of the open center type, but it may also be of the closed center type. The metering valve 22 includes an axial bore 32 formed in the body portion 33 of the feedback motor 20. Slidably disposed within the bore 32 is a valve spool 34 biased in one direction by spring 39 and actuated by rotation of the steering shaft 28 through a linkage comprising a screw driven cam nut 36 acting against a pivoted cam following lever arm 37 and a push rod 38. The linkage is shown and described in greater detail in the copending application of Eugene Bahniuk and Jack L. Thompson, Ser. No. 576,881, filed Sept. 2, 1966, now abandoned.

Spaced along the metering valve bore 32 are three annular grooves 40, 41 and 42. The center groove 41 is connected to the pump P through line 44 and the two outer grooves 40 and 42 are connected to the reservoir 10 through a common drain line 45. The valve spool 34 includes three lands 47, 48 and 49 spaced apart by grooves 50 and 51 connected to the selector valve assembly 16 through lines 52 and 54 respectively.

The selector valve assembly 16 includes a housing 56 having a bore 58 at the ends of which are cavities 60 and 61 connected to the metering valve 22 through lines 52 and 54. Spaced along the bore 58 are annular grooves 63, 64, 65, 66, 67, 68 and 69 and 70. Slidably disposed within the bore 58 is a valve spool assembly 72 composed of separate spool sections 73, 74 and 75. The left spool 73 has lands 76 and 77 thereon spaced apart by a reduced diameter annular groove 107. Likewise the right spool 75 has lands 79 and 80 spaced apart by grooves 108. The center spool 74 has a single land 78 and left and right spacing projections 87 and 88 to space the adjacent spool lands 77 and 79 from center spool land 78. These lands 76, 77, 78, 79 and 80 operate to open and close the grooves 63 through 70 as the valve spool assembly is shifted within the bore 58, as described in greater detail in the aforesaid application Ser. No. 503,808.

The groove pairs 63, 66 and 67, 70 in the selector valve assembly are connected to the left and right sides, respectively, of the case pressurization valve assembly 14 through common lines 82, 83 respectively, while grooves 64 and 69 are connected to the left and right ends of the expansible chamber fluid actuator motor 18 through lines 84 and 85 respectively. Grooves 65 and 68 act as drain to the reservoir 10 through common line 86.

The case pressurization valve assembly 14 includes a body 90 having a central bore 92 in which a valve spool 94 is slidably disposed. Stops 91 and 93 at opposite ends of the bore 92 limit the axial movement of the valve spool 94. The valve spool 94 is provided with control means in the form of external lands 95 and 96 which cooperate with a plurality of annular grooves 97, 98, 99, 100 and 101 spaced along the bore 92. Of these grooves the groove pairs 97, 98 and 100, 101 are connected together internally and to the selector valve assembly 16 through common lines 82 and 83 respectively, and to the feedback motor 20 through lines 103 and 104 respectively. Line 105 connects groove 99 to the cavity 15 enclosed by the feedback motor case 13.

The expansible chamber fluid actuator motor assembly 18 includes a cylinder 110 separated into two internal chambers 111 and 112 by a piston 113. A pair of piston rods 114 and 115 connect the piston 113 to the steerable wheels 116 and 117 of the vehicle respectively. It will be understood that this expansible chamber fluid actuator motor assembly may be of any conventional type usable for moving one or more steerable wheels or other steering device in reversible directions for steering the vehicle. The lines 84 and 85 from the selector valve assembly 16 are connected to the chambers 111 and 112 respectively and function alternately as supply and drain lines for the motor chambers during operation of the steering system.

With the hydrostatic system in operation, the pump P supplies fluid under pressure from the reservoir 10 through line 44 to the center groove 41 in the metering valve assembly 22. If the steering wheel 30 remains in a center neutral position, the valve spool 34 also remains centered within the bore 32 of the metering valve and the pressurized fluid circulates from the pump P through the valve spool grooves 50 and 51 into grooves 40 and 42 and back to the reservoir 10 through common drain line 45.

During a right turn the steering wheel 30 is rotated to the right causing the cam nut 36 to move axially to the left away from the lower end of the lever arm 37 allowing spring 39 in the metering valve assembly 22 to force the metering valve spool 34, push rod 38 and the top end of the lever arm 37 to the right. This movement of the valve spool 34 causes the groove 41 to be blocked off from grooves 40 and 42 and line 54 by valve spool lands 47 and 48 while remaining in communication with line 52 through spool groove 50. Thus, the pressurized fluid flows from groove 41 out of the metering valve assembly 22 through line 52 to the cavity 60 in the right end of the selector valve assembly 16. By pressurizing the fluid within the chamber 60, the entire valve spool assembly 72 is forced to the left causing land 80 to open groove 70 to the pressurized fluid within the cavity 60. From the groove 70 the pressurized fluid flows through line 83 to the grooves 100 and 101 in the case pressurization valve 14. This causes a greater force to be exerted on the right end of the valve spool 94 forcing it to the left into engagement with the stop 91. In this position the land 95 no longer covers groove 98 and grooves 98 and 99 are in communication with each other through spool groove 89 porting the lower pressure acting on the left end of the valve spool 94 through line 105 to the cavity 15 of the feedback motor and metering valve assembly 12.

From the groove 101 the pressurized fluid flows through line 104 to the feedback motor assembly 20 where it acts upon the left or working end of the pistons 24 forcing them into the cavity 15 to rotate the cam plate 27. Rotation of the cam plate 27 also rotates the cam nut 36 through a tongue and groove arrangement 31 and 35 causing it to move axially and pivot the top end of the lever arm 37 to the left. This recenters the metering valve spool 34 and reduces the flow of fluid from the pump P to the system in proportion to the amount of fluid that has passed through the feedback motor assembly to the actuator motor.

Due to the friction losses in the lines and the work losses in the feedback motor, the pressures acting on the left end of the case pressurization valve spool 94 and on the non-working ends of the pistons 24 within the cavity 15 are less than those acting on the right end of valve spool 94 and on the working ends of the pistons 24 within the bores 25. Therefore, there is a slight pressure differential across the pistons 24 tending to force the pistons into the cavity rather than a large differential as would be the case if the cavity 15 were not positively pressurized but vented to the atmosphere. Since only a small amount of work is required to reposition the metering valve assembly, this reduction in the pressure differential does not adversely affect the repositioning of the metering valve assembly. Instead the slight pressure differential allows the feedback motor assembly to operate in a substantially unloaded condition thereby greatly reducing the mechanical stresses exerted upon it as well as the fluid leakage losses across the pistons.

From the feedback motor 20, the pressurized fluid flows through groove 97 in the case pressurization valve assembly 14 and line 82 to groove 63 in the left portion of the selector valve assembly 16. With the valve spool assembly 72 shifted to the left under the action of the pressurized fluid in the cavity 60, groove 63 is in communication with the left chamber 111 in the actuator motor 18 through spool groove 107, groove 64, and line 84. Pressurization of chamber 111 forces piston 113 to the right turning wheels 116 and 117 to the right. Movement of the piston 113 to the right also causes the fluid within the right chamber 112 to drain back to the reservoir 10 through line 85, grooves 69, 108 and 68 in the selector valve assembly 16 and common drain line 86.

Should the supply of pressurized fluid to the metering valve assembly 22 fail, the feedback motor 20 can be manually driven as a pump by turning the steering wheel 30. With no pressurized fluid being supplied through the metering valve assembly 22 to the feedback motor 20, the play in the lost motion connection 29 between the steering shaft 28 and the cam plate 27 is taken up and the cam plate drives the pistons 24 to pump fluid through the feedback motor. As the operator turns the steering wheel 30 for a right turn, the feedback motor 20 pumps fluid through line 103, groove 97 in the case pressurization valve and line 82 to the selector valve assembly 16. Since groove 63 is blocked by spool land 76 the pressurized fluid within groove 66 forces valve spool section 73 to the left and valve spool sections 74 and 75 to the right as a unit. With valve spool section 73 shifted to the left the pressurized fluid flows through grooves 63, spool groove 107 and line 84 to the left chamber 111 in the actuator motor assembly 18 turning the wheels 116 and 117 to the right.

The fluid draining from chamber 112 passes through line 85, grooves 69, 108 and 70 and line 83 to grooves 100 and 101 in the case pressurization valve assembly 14. Since the valve spool 94 was forced to the right by the higher fluid pressure through groove 97, the fluid within cavity 15 is open to the feedback motor inlet through grooves 100, 89 and 99 and line 105 and the cavity 15 serves as an oil reservoir for the pump inlet to draw from through line 104 to replace any oil leakage from the system. From groove 101 the fluid drain back to the inlet side of the feedback motor assembly 20 through line 104. Thus, during manual operation of the system a closed fluid circuit is provided, within the system independent of the pump P and reservoir 10.

While the preferred embodiment of this invention has been shown and described in detail, it is recognized that this invention is not limited to such specific details and other modifications and rearrangements may be resorted to by those skilled in the art in the light of this invention without departure from its scope as defined in the following claims.

We claim:

1. A hydraulic control system having a reversible actuator motor; a source of fluid pressure; a selector means; a metering valve interconnected with said selector means and operable to selectively direct fluid from said fluid pressure source to said actuator motor in response to movement of said selector means; a reversible positive displacement feedback motor interconnected with said metering valve and said actuator motor and having a case defining a fluid cavity, a working element, an inlet and an outlet, said feedback motor being operable to provide a follow-up repositioning action on said metering valve proportional to the response of said actuator motor; and pressurization valve means interconnected across said inlet and said outlet of said feedback motor and communicating with the non-working side of said working element and being operable responsive to the higher of the two pressures in said inlet and said outlet to port the lower of said pressures to the non-working side of said working element to reduce the pressure differential across the working element.

2. A hydraulic control system as set forth in claim 1 wherein said working element is a reciprocating member.

3. A hydraulic control system as set forth in claim 2 wherein said working element is a piston having its longitudinal axis substantially parallel to the axis of rotation of said feedback motor.

4. A hydraulic control system as set forth in claim 1 wherein said feedback motor is an axial piston motor having a housing defining a fluid cavity, a stationary cylinder block, a cam plate within said housing and a plurality of pistons slidably disposed within said cylinder block and acting against said cam plate in said housing to provide the follow-up action on said metering valve, said pressurization valve porting the lower of said pressures to said housing.

5. A hydraulic control system as set forth in claim 1 wherein said working element is a piston having one end thereof exposed to pressurized fluid from said fluid pressure source and an opposite end exposed to said fluid cavity and said pressurization valve means ports said lower pressure to said fluid cavity within the case of the feedback motor to pressurize the fluid therein thereby reducing the pressure differential across said piston.

6. A hydraulic control system as set forth in claim 1 wherein said pressurization valve means includes an axially sliding valve spool adapted to be shifted axially by said higher pressure to interconnect said lower pressure to the non-working side of the working element.

7. A hydraulic control system as set forth in claim 1 wherein said pressurization valve means comprises a body member defining a chamber having a plurality of ports arranged therearound and opening thereinto, one of said ports communicating with the non-working side of said working element in said feedback motor and at least two other of said ports communicating with said inlet and outlet, a valve spool disposed within said chamber and having control means thereon so arranged relative to said ports that the higher of the two pressures within said inlet and outlet shifts said valve spool to a position wherein said control means interconnects the lower of said pressures to said one port.

8. A hydraulic control system as set forth in claim 7 wherein said chamber is an axial bore with said valve spool being slidably disposed therein, said ports terminate in recesses, and said control means comprise lands and grooves.

9. A hydraulic control system as set forth in claim 1 wherein said selector means comprises an input shaft connected to said feedback motor through a lost motion connection.

10. A hydraulic control system having a reversible actuator motor; a source of fluid pressure connected to a fluid reservoir; a selector means; a metering valve interconnected with said selector means and operable to selectively connect said fluid pressure source to said actuator motor in response to movement of said selector means; a reversible positive displacement feedback motor having a working element, an inlet and an outlet, said feedback motor being interconnected with said metering valve and operable to provide a follow-up repositioning action on said metering valve proportional to the response of said actuator motor, means interconnecting said selector means and said feedback motor in such a manner that in the absence of fluid under pressure from said source of fluid pressure said feedback motor is manually driven as a pump by manipulation of said selector means; a condition selector valve interconnecting said metering valve, said actuator motor and said feedback motor to direct fluid from said metering valve to said feedback motor and from said feedback motor to said actuator motor and from said actuator motor to said reservoir; and pressurization valve means interconnected across said inlet and said outlet between said selector valve and said feedback motor, said pressurization valve means being responsive to the higher of the two pressures in said inlet and said outlet to port the lower of said pressures to the non-working side of said working element to reduce the pressure differential across the working element.

11. A hydraulic control system having a reversible actuator motor; a source of fluid pressure connected to a fluid reservoir; a selector means; a metering valve interconnected with said selector means and being operable in response to movement of said selector means to selectively connect said fluid pressure source to said actuator motor; a reversible positive displacement feedback motor having a cylinder block, a housing defining a fluid cavity adjacent said cylinder block, a cam plate rotatably disposed within said fluid cavity, a plurality of pistons axially slidably disposed within said cylinder block and each piston having one end exposed to pressurized fluid from said fluid pressure source and the other end acting against said cam plate to rotate said cam plate in response to action of said pressurized fluid upon said one end; means interconnecting said cam plate and said metering valve whereby rotation of said cam plate by said pressurized fluid provides a follow-up action on said metering valve; a lost motion connection interconnecting said cam plate and said selector means whereby in the absence of fluid pressure from said source said cam plate can be rotated manually by manipulation of said selector means to operate said feedback motor as a pump; a condition selector valve interconnecting said metering valve, said actuator motor and said feedback motor to direct fluid from said metering valve to said feedback motor and from said feedback motor to said actuator motor and from said actuator motor to said reservoir; and pressurization valve means interconnected across said inlet and said outlet for said feedback motor between said selector valve and said feedback motor, said pressurization valve means including a body member defining a chamber having a plurality of ports arranged therearound and opening thereinto, one of said ports communicating with said fluid pressure cavity within said housing in said feedback motor and at least two other of said ports communicating with said inlet and said outlet for said feedback motor, a valve spool slidably disposed within said chamber and having control means thereon arranged relative to said ports so that the higher of the two pressures within said inlet and said outlet shifts said valve spool to a position wherein said control means interconnects the lower of said pressures with said fluid cavity within said housing thereby pressurizing the fluid therein and reducing the pressure differential across said pistons.

12. A hydraulic control system having a reversible actuator motor; a source of fluid pressure; a selector means; a metering valve operable by said selector means to selectively direct fluid from said fluid pressure source to said actuator motor in response to movement of said selector means; a reversible positive displacement feedback motor having a housing defining a fluid chamber, a working element having a side exposed to said chamber, an inlet and an outlet; said feedback motor being operable by fluid flow at said actuator motor to provide a follow-up action for said metering valve proportional to the response of said actuator motor; and valve means adapted to connect the lower of the two pressures in said inlet and said outlet to said chamber to reduce the pressure differential across the working element.

13. A hydraulic control system having a reversible actuator motor; a source of fluid pressure; a selector means; a metering valve operable by said selector means to selectively direct fluid from said fluid pressure source to said actuator motor in response to movement of said selector means; a reversible positive displacement feedback motor having a housing defining a fluid chamber, a working element having a side exposed to said chamber, an inlet and an outlet; said feedback motor being operable by fluid flow at said actuator motor to provide a follow-up repositioning action for said metering valve proportional to the response of said actuator motor; and pressurization valve means interconnected across said inlet and said outlet of said feedback motor and communicating with the non-working side of said working element and being operable coincident to the operation of said feedback motor to port the lower of the two pressures in said inlet and said outlet to said chamber and the non-working side of said working element to reduce the pressure differential across the working element.

14. A hydraulic control system having a reversible actuator motor; a source of fluid pressure; a selector means; a metering valve operable by said selector means to selectively direct fluid from said fluid pressure source to said actuator motor in response to movement of said selector means; a reversible positive displacement axial piston feedback motor having a housing, a chamber in said housing, a rotatable cam plate in said chamber, a cylinder block, and a plurality of pistons in said cylinder block extending into said chamber to engage said cam plate, said feedback motor having an inlet and an outlet; said feedback motor being connected to said metering valve to be operable by fluid flow at said actuator motor to provide a follow-up repositioning action for said metering valve proportional to the response of said actuator motor, and valve means interconnected across said inlet and said outlet of said feedback motor and communicating with said chamber to be operable coincident to the operation of said feedback motor to port the lower of the two pressures of said inlet and said outlet to said chamber to reduce the pressure differential across said pistons.

No references cited.

EDGAR W. GEOGHEGAN, *Primary Examiner.*